United States Patent [19]
Chang

[11] Patent Number: 5,852,948
[45] Date of Patent: Dec. 29, 1998

[54] WHEEL HUB AND TRANSMISSION GEAR ARRANGEMENT OF A CHAINLESS TRANSMISSION MECHANISM FOR A BICYCLE

[76] Inventor: Chen-Ching Chang, 3/F., No. 37, Jih-Hsin St., Shu-Lin Town, Taipei County, Taiwan

[21] Appl. No.: 803,505

[22] Filed: Feb. 20, 1997

[51] Int. Cl.⁶ ........................................................ F16H 1/14
[52] U.S. Cl. .............................. 74/417; 403/326; 280/260
[58] Field of Search ...................... 74/417, 423; 280/260, 280/262; 403/326, 327, 328, 375

[56] References Cited

U.S. PATENT DOCUMENTS

| | | | |
|---|---|---|---|
| 5,299,819 | 4/1994 | Leu | 280/260 |
| 5,482,306 | 1/1996 | Hsu | 280/260 |
| 5,499,884 | 3/1996 | Kuhnhold et al. | 403/326 X |
| 5,667,332 | 9/1997 | Lindholm | 403/326 X |

*Primary Examiner*—Charles A. Marmor
*Assistant Examiner*—David Fenstermacher
*Attorney, Agent, or Firm*—Rosenberg, Klein & Bilker

[57] ABSTRACT

A wheel hub and transmission gear arrangement of a chainless transmission mechanism for a bicycle, including a wheel hub having an axle block with an outside annular groove and intersected locating grooves, a transmission gear having an annular base mounted on the axle block, the annular base having a plurality of inward projecting blocks respectively forced into engagement with the locating grooves of the axle block and an inside annular groove, and a split binding ring mounted within the outside annular groove of the axle block and the inside annular groove of the transmission gear to firmly secure the axle block and the transmission gear together.

4 Claims, 5 Drawing Sheets

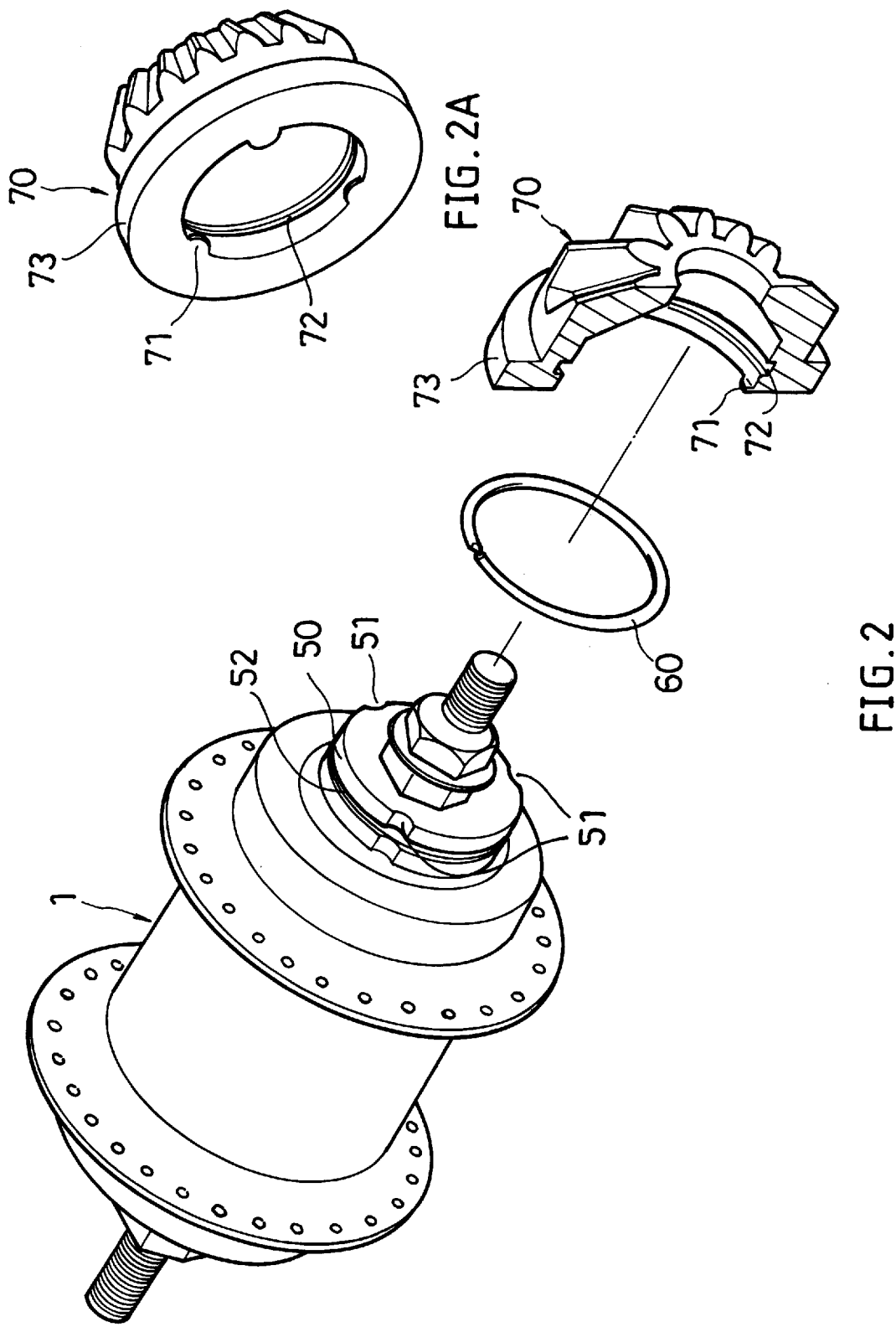

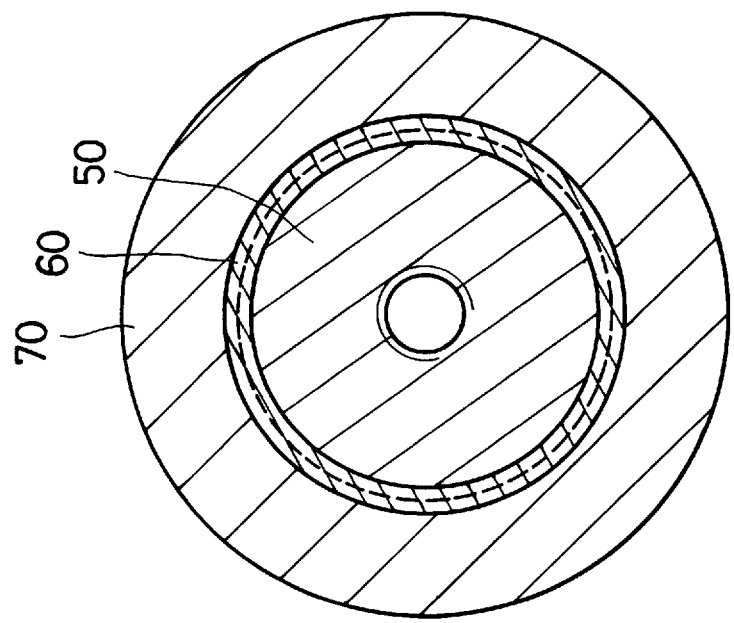
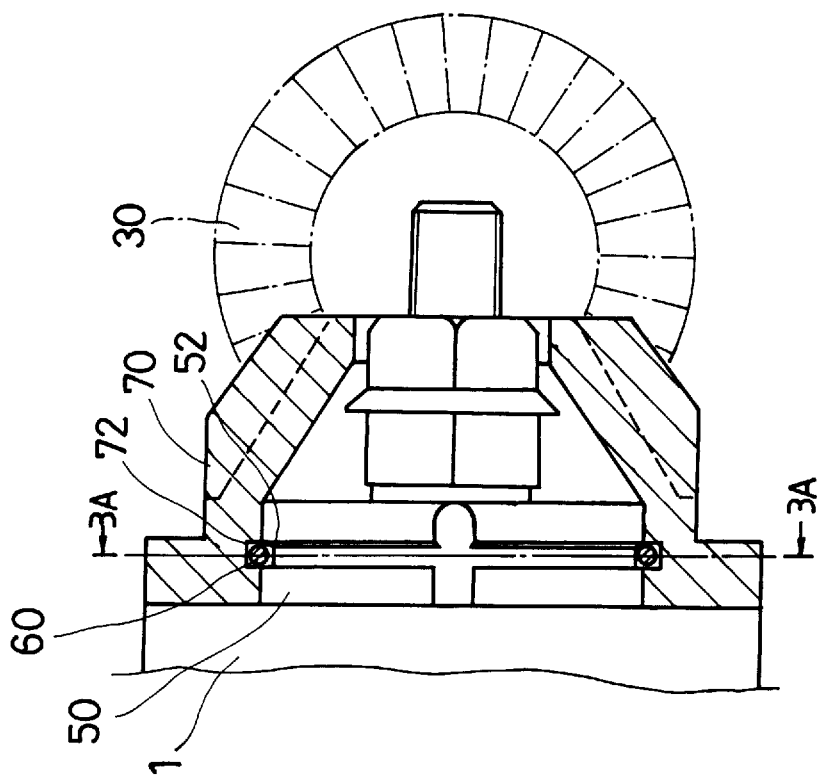
FIG. 3A
FIG. 3

WHEEL HUB AND TRANSMISSION GEAR ARRANGEMENT OF A CHAINLESS TRANSMISSION MECHANISM FOR A BICYCLE

BACKGROUND OF THE INVENTION

The present invention relates to a wheel hub and transmission gear arrangement of a chainless transmission mechanism for a bicycle, and more particularly to such a wheel hub and transmission gear arrangement which secures a transmission gear to an axle block of a wheel hub by a split metal binding ring.

FIG. 1 shows a chainless transmission mechanism for a bicycle according to the prior art. Referring to FIGS. 1, 1A, 1B and 1C, this chainless transmission mechanism comprises a wheel hub 1 having an axle block 10 at one side and a mounting hole 11 at the periphery of the axle block 10, a transmission gear 20 mounted around the axle block 10 and having a through hole 21 connected to the mounting hole 11 by a screw rod 22, a drive gear 30 meshed with the transmission gear 20 and turned by a drive shaft 40. This transmission gear and wheel hub mounting structure has drawbacks. Because the connecting area between the transmission gear 20 and the axle block 10 of the wheel hub 1 is simply at "a single point", the reactive force is concentrated at the screw rod 22 when the transmission gear 20 is driven to turn the wheel hub 1. Therefore, the screw rod 22 tends to be forced to deform or to break, and the transmission gear 20 tends to displace, causing the driving force unable to be fully and smoothly transmitted to the wheel hub 1. Furthermore, the annular structure of the transmission gear 20 is weak, therefore the transmission gear 20 wears quickly with use.

SUMMARY OF THE INVENTION

It is one object of the present invention to provide a wheel hub and transmission gear arrangement which can be quickly assembled without the use of a hand tool. It is another object of the present invention to provide a wheel hub and transmission gear arrangement which enables the axle block of the wheel hub to evenly bear the pressure of the transmission gear so that the driving force can be smoothly and fully transmitted to the wheel hub. It is still another object of the present invention to provide a wheel hub and transmission gear arrangement which uses a split metal binding ring to peripherally secure the axle block and the transmission gear together, so that the transmission gear and the axle block of the wheel hub are constantly maintained in close contact with each other without leaving a gap therebetween. It is still another object of the present invention to provide a wheel hub and transmission gear arrangement which produces less reactive force to the transmission gear so that the service life of the transmission gear is greatly prolonged.

BRIEF DESCRIPTION OF THE DRAWINGS

FIG. 2 is an exploded view of the present invention;

FIG. 2A is a rear elevational view of the transmission gear according to the present invention;

FIG. 3 is a sectional assembly view of the present invention; and

FIG. 3A is a sectional view taken along line A—A of FIG. 3.

DETAILED DESCRIPTION OF THE PREFERRED EMBODIMENT

Figure 1:
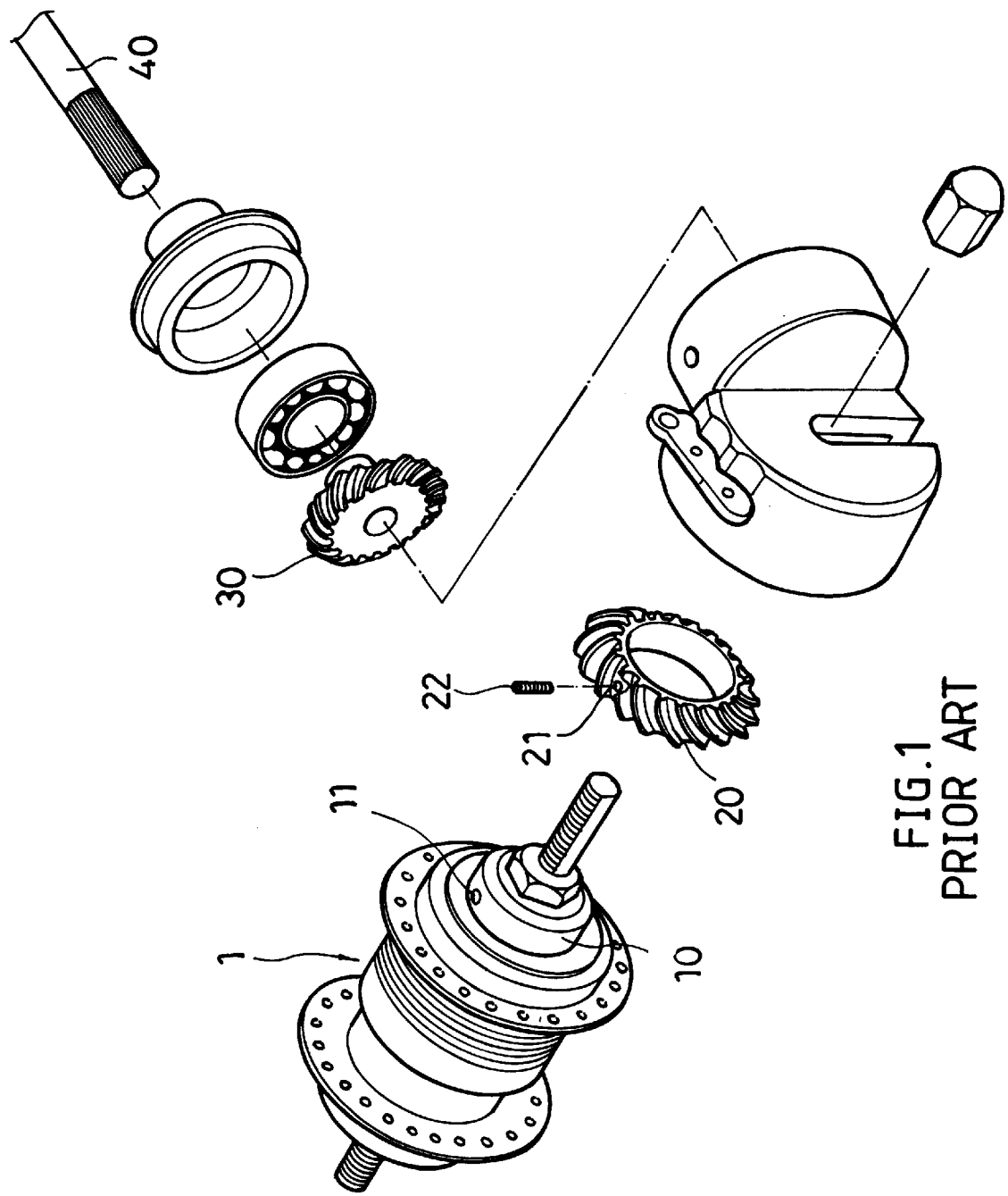
FIG. 1 is an exploded view of a chainless transmission mechanism for a bicycle according to the prior art.
Figure 1A:
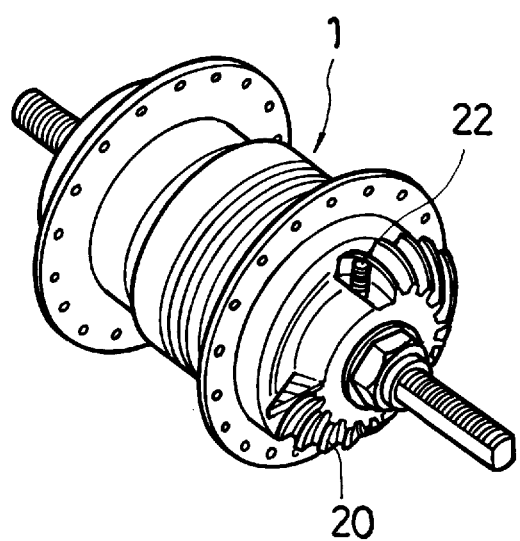
FIG. 1A is an assembly view of the wheel hub and transmission gear of the chainless transmission mechanism shown in FIG. 1.
Figure 1C:
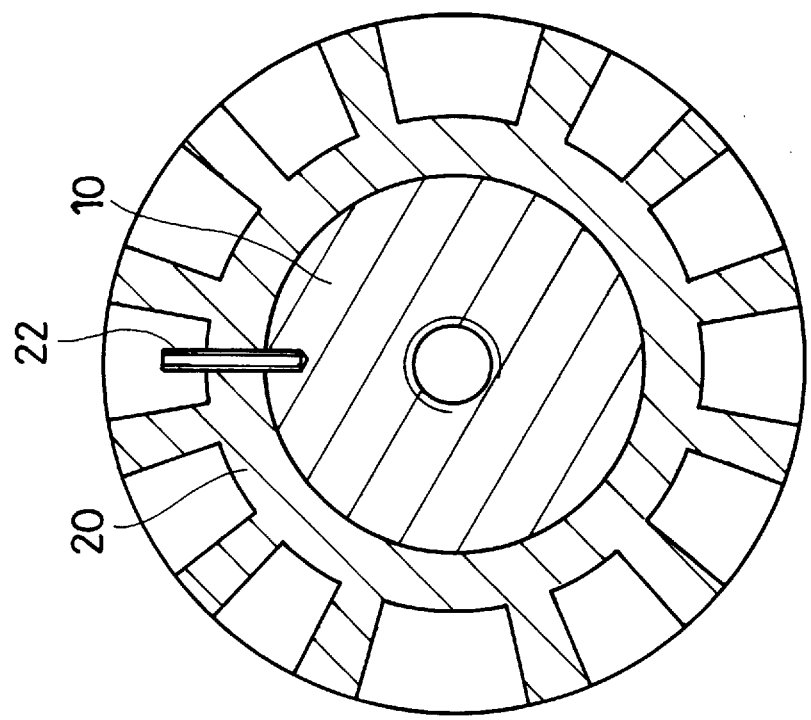
FIG. 1C is a sectional view taken along line A—A of FIG. 1B.
Figure 1B:
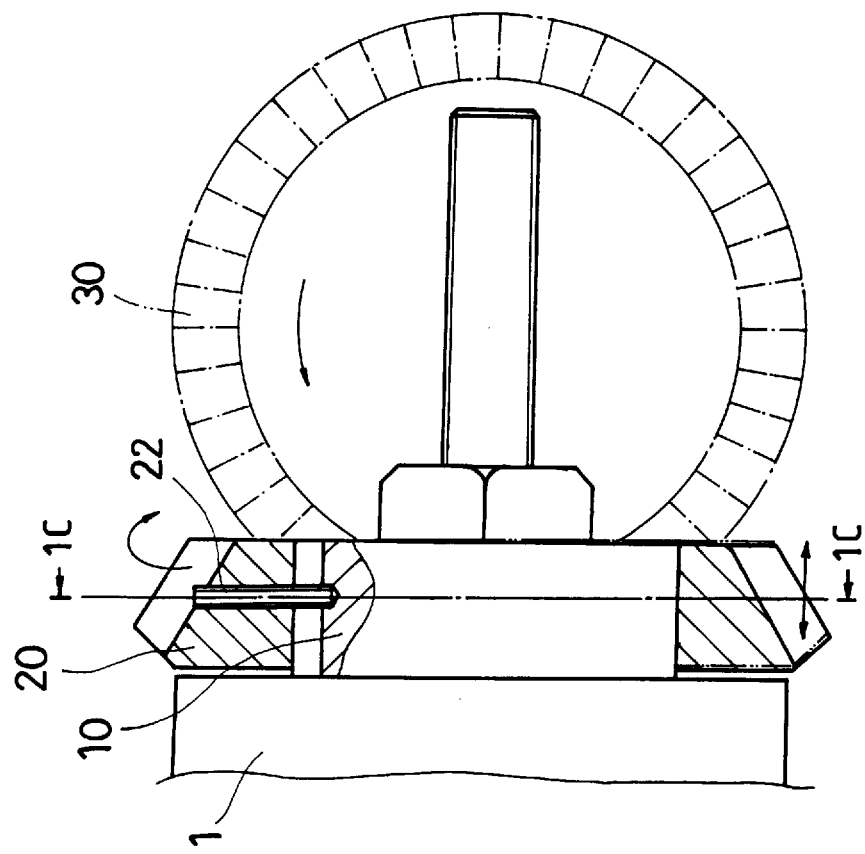
FIG. 1B is a sectional view of FIG. 1A.

Referring to FIG. 2, the wheel hub, referenced by 1, has a unitary axle block 50 adapted for holding a transmission gear 70. The transmission gear 70 comprises an annular base 73, an annular groove 72 disposed around the inside wall of the annular base 73, and a plurality of projecting blocks 71 raised from the inside wall of the annular base 73. The axle block 50 comprises an annular groove 52 around the periphery corresponding to the annular groove 72 of the transmission gear 70, and a plurality of locating grooves 51 spaced around the periphery corresponding to the projecting blocks 71 of the transmission gear 70 and intersecting the annular groove 52.

Referring to FIG. 3 and 3A, a split metal binding ring 60 is mounted in the annular groove 52 around the axle block 50, then the transmission gear 70 is mounted on the axle block 50 by forcing the projecting blocks 71 into the locating grooves 51. When the annular base 73 of the transmission gear 70 is forced into engagement with the axle block 50, the split metal binding ring 60 is compressed for permitting the transmission gear 70 to be forced into position. When the transmission gear 70 is set into position, the split metal binding ring 60 is forced into engagement with the annular groove 72 of the transmission gear 70, and therefore the transmission gear 70 and the axle block 50 are firmly retained together.

What the invention claimed is:

1. A chainless transmission system comprising:

(a) a wheel hub assembly including an axle block having formed therein a circumferentially extended first annular groove;

(b) a transmission gear coaxially coupled to said axle block, said transmission gear including a toothed portion and an annular base portion, said annular base portion having formed therein a second annular groove, said annular base portion having formed thereon at least one radially directed projecting block segment for lockingly engaging said wheel hub assembly axle block; and, (c) a split binding ring coaxially captured between said transmission gear and said axle block for the relative axial retention thereof, said split binding ring engaging said first and second annular grooves.

2. The chainless transmission system as recited in claim 1 wherein said toothed and annular base portions of said transmission gear are integrally formed.

3. A chainless transmission system comprising:

(a) a wheel hub assembly including an axle block having formed therein a circumferentially extended first annular groove and a plurality of axially extended locating grooves traversing said first annular groove;

(b) a transmission gear coaxially coupled to said axle block, said transmission gear including a toothed portion and an annular base portion, said annular base portion having formed therein a second annular groove, said annular base portion having formed thereon a plurality of projecting block segments extending radially inward to respectively engage said locating grooves of said wheel hub assembly axle block; and, (c) a split binding ring coaxially captured between said transmission gear and said axle block for the relative axial retention thereof, said split binding ring engaging said first and second annular grooves.

4. The chainless transmission system as recited in claim 3 wherein said toothed and annular base portions of said transmission gear are integrally formed.

* * * * *

UNITED STATES PATENT AND TRADEMARK OFFICE
CERTIFICATE OF CORRECTION

PATENT NO. : 5,852,948

DATED : December 29, 1998

INVENTOR(S) : Chen-Ching Chang

It is certified that error appears in the above-identified patent and that said Letters Patent is hereby corrected as shown below:

Column 1, line 66, change "A-A" to --section line 1C-1C--.

Column 2, line 6, change "A-A" to --section line 3A-3A--.

Signed and Sealed this

Twenty-third Day of March, 1999

Attest:

Q. TODD DICKINSON

Attesting Officer

Acting Commissioner of Patents and Trademarks